United States Patent
Chang et al.

(10) Patent No.: US 7,616,598 B2
(45) Date of Patent: Nov. 10, 2009

(54) SYSTEM AND METHOD FOR COUPLING BETWEEN MOBILE COMMUNICATION SYSTEM AND WIRELESS LOCAL AREA NETWORK

(75) Inventors: Hong-Sung Chang, Suwon-si (KR); Tae-Won Kim, Yongin-si (KR); Sang-Do Lee, Suwon-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 10/952,729

(22) Filed: Sep. 30, 2004

(65) Prior Publication Data

US 2005/0068929 A1 Mar. 31, 2005

(30) Foreign Application Priority Data

Sep. 30, 2003 (KR) .................. 10-2003-0070433

(51) Int. Cl.
*H04W 4/00* (2009.01)
*H04W 36/00* (2009.01)
*H04L 12/66* (2006.01)
*H04L 12/28* (2009.01)

(52) U.S. Cl. .............. 370/328; 370/331; 370/338; 370/352; 370/395.52; 370/401; 455/436; 455/432.1

(58) Field of Classification Search ...................
370/395.52–395.53, 395.5, 395.2, 395.3,
370/310, 338, 328–334, 348–349, 351–363,
370/389, 408, 400–401, 373, 384, 386, 395.21;
455/436–451, 422.1, 41.2, 550.1, 435.1–435.2,
455/452.1, 452.2, 560–561, 556.2, 432.1–432.3,
455/433–434, 442, 448

See application file for complete search history.

(56) References Cited

U.S. PATENT DOCUMENTS

| 6,725,044 | B2 * | 4/2004 | Verma et al. ............. 455/444 |
| 6,990,330 | B2 * | 1/2006 | Veerepalli et al. ........ 455/406 |
| 7,054,634 | B2 | 5/2006 | Watanabe et al. |
| 7,280,505 | B2 * | 10/2007 | Chaskar et al. .......... 370/331 |

(Continued)

FOREIGN PATENT DOCUMENTS

| JP | 2003 235064 A | 8/2003 |
| JP | 2003 259457 A | 9/2003 |
| JP | 2005 514809 A | 5/2005 |
| WO | WO 03-105356 | 2/2003 |
| WO | 03054721 A1 | 7/2003 |
| WO | WO 03-054721 | 7/2003 |

*Primary Examiner*—Meless N Zewdu
(74) *Attorney, Agent, or Firm*—Roylance, Abrams, Berdo & Goodman, L.L.P.

(57) ABSTRACT

A system for providing communication when a mobile station moves between a wireless LAN system and a mobile communication system. A packet data service node provides a packet data service between an IP network and the mobile station when the mobile station accesses the mobile communication system. A packet control function provides the packet data service between a correspondent node connected to the IP network and the mobile station when the mobile station previously connected to the mobile communication system is connected to an access point, and provides the packet data service between the correspondent node connected to the IP network and the mobile station when the mobile station previously connected to the access point is connected to a base station system. An interworking server connected between the access point of the wireless LAN system and the packet control function of the mobile communication system.

12 Claims, 13 Drawing Sheets

U.S. PATENT DOCUMENTS

| | | | |
|---|---|---|---|
| 2002/0085516 A1 | 7/2002 | Bridgelall | 370/329 |
| 2002/0136226 A1 | 9/2002 | Christoffel et al. | 370/401 |
| 2003/0139180 A1 | 7/2003 | McIntosh et al. | 455/426 |
| 2004/0008645 A1* | 1/2004 | Janevski et al. | 370/331 |
| 2004/0008689 A1* | 1/2004 | Westphal et al. | 370/395.21 |
| 2004/0087304 A1* | 5/2004 | Buddhikot et al. | 455/426.2 |
| 2004/0090937 A1* | 5/2004 | Chaskar et al. | 370/331 |
| 2004/0114553 A1* | 6/2004 | Jiang et al. | 370/328 |
| 2004/0162105 A1 | 8/2004 | Reddy et al. | 455/551 |

* cited by examiner

SYSTEM AND METHOD FOR COUPLING BETWEEN MOBILE COMMUNICATION SYSTEM AND WIRELESS LOCAL AREA NETWORK

PRIORITY

This application claims priority under 35 U.S.C. §119(a) to an application entitled "System and Method for Coupling between Mobile Communication System and Wireless Local Area Network" filed in the Korean Intellectual Property Office on Sep. 30, 2003 and assigned Serial No. 2003-70433, the entire contents of which are incorporated herein by reference.

BACKGROUND OF THE INVENTION

1. Field of the Invention

The present invention relates generally to a system and method for coupling between a mobile communication system and a wireless local area network (LAN), and in particular, to a coupling system and method adapted to support handoff between a cellular network and a wireless LAN.

2. Description of the Related Art

Currently, much research and many developments are being made in wireless communications, and use of wireless communications is rapidly increasing even in the home. To provide wireless access in the home, several wireless terminals (or mobile stations) access a wired network via a wireless access node. However, the future growth of a high-sound-quality, high-video quality multimedia data service (or audio/video service) over the Internet or High Definition (HD)-class TV requires technology for supporting high-speed data transmission at 100 Mbps (mega bits per second) or higher even in a wireless communication network.

In order to prevent a waste of bandwidth to secure the high-speed data transmission, the wireless terminals are allowed to access a wireless access node and a mobile communication system and transmit multimedia data on a real-time basis.

The 3$^{rd}$ Generation Partnership Project (3GPP), a standardization organization for mobile communication system, classifies a coupling method as either a "loosely-coupled method" or a "tightly-coupled method" according to a coupling point, as shown in FIG. 1, between a mobile communication system and a wireless LAN system (hereinafter referred to as a wireless LAN). A description of the two coupling methods will be made herein below with reference to the accompanying drawings.

1) Loosely-Coupled Method

As illustrated in FIG. 2, the loosely-coupled method couples a wireless LAN to an interface between a gateway General Packet Radio Services (GPRS) support node (GGSN), which corresponds to a packet data service node (PDSN) 220 in 3$^{rd}$ Generation Partnership Project 2 (3GPP2), and an external Internet Protocol (IP) network. In this method, wireless LAN traffic does not pass through a core network of a cellular network or base station system/packet control function (BSS/PCF) 210. Therefore, the loosely-coupled method can couple a mobile communication system or mobile station (MS) 200 to a wireless LAN access point (AP) 230 regardless of access network technology. Further, because the loosely-coupled method considers only an Authentication, Authorization and Accounting (AAA) server 240, it can be simply implemented. However, because wireless LAN traffic does not pass through the core network of the cellular network, the loosely-coupled method suffers from handoff delay and packet loss, and cannot support handoff between the cellular network and the wireless LAN based on Simple IP.

2) Tightly-Coupled Method

As illustrated in FIG. 3, however, the tightly-coupled method couples a wireless LAN to a serving GPRS support node (SGSN), a core network of a cellular network, which corresponds to a packet control function (PCF) in 3GPP2. In this method, wireless LAN traffic passes through the core network of the cellular network. That is, when a mobile station (MS) 300 is connected to a cellular network, the mobile station 300 is connected to a packet control function (PCF) 320 and a packet data service node (PDSN) 330 via a base station system (BSS) 310 that deals with a cellular network access standard. However, when the mobile station 300 is connected to a wireless LAN, the mobile station 300 is connected to the packet control function 320 and the packet data service node 330 via an access point (AP) 340, and communicates with a correspondent node (CN) via an Internet Protocol (IP) network.

Therefore, the tightly-coupled method has less handoff delay and packet loss, and can support handoffs between the cellular network and the wireless LAN based on Simple IP. However, the tightly-coupled method needs to implement a coupled gateway function based on access network technology and apply modifications to a mobile station and the cellular network. The tightly-coupled method also influences the core network of the cellular network with the wireless LAN traffic.

Most of recently-proposed technologies for coupling a cellular network to a wireless LAN adopt the loosely-coupled method. However, the loosely-coupled method does not support handoffs between a mobile communication system and a wireless LAN based on Simple IP. Accordingly, there is a demand for a function capable of supporting handoffs between a mobile communication system and a wireless LAN based on Simple IP. Also, there is a demand for a function capable of supporting handoffs between a mobile communication system and a wireless LAN based on Mobile IP.

SUMMARY OF THE INVENTION

It is, therefore, an object of the present invention to provide a system and method for coupling between a mobile communication system and a wireless LAN based on a tightly-coupled method.

It is another object of the present invention to provide a system and method for coupling between a mobile communication system and a wireless LAN, for a mobile station using either Simple IP or Mobile IP.

To achieve the above and other objects, there is provided a system for providing seamless communication when a mobile station moves between a wireless local area network (LAN) system and a mobile communication system. The system includes a mobile communication system, a wireless LAN system and a mobile station (MS) capable of communicating with the mobile communication system and a wireless LAN system. A packet data service node (PDSN) provides a packet data service between an Internet Protocol (IP) network and the mobile station when the mobile station accesses the mobile communication system. A packet control function (PCF) provides the packet data service between a correspondent node connected to the IP network and the mobile station when the mobile station previously connected to the mobile communication system is connected to an access point. The PCF further provides the packet data service between the correspondent node connected to the IP network and the mobile station when the mobile station previously connected to the access point is connected to a base station system (BSS). An interworking server, connected between the access point (AP) of the wireless LAN system and the packet control function of the mobile communication system, couples the packet control function to the access point when providing the packet data service to the mobile station.

BRIEF DESCRIPTION OF THE DRAWINGS

The above and other objects, features and advantages of the present invention will become more apparent from the following detailed description when taken in conjunction with the accompanying drawings in which.

Like reference numerals are used in the drawing figures to refer to like structures and features.

DETAILED DESCRIPTION OF THE PREFERRED EMBODIMENTS

Several preferred embodiments of the present invention will now be described in detail with reference to the annexed drawings. In the following description, a detailed description of known functions and configurations has been omitted for conciseness.

Figure 1:
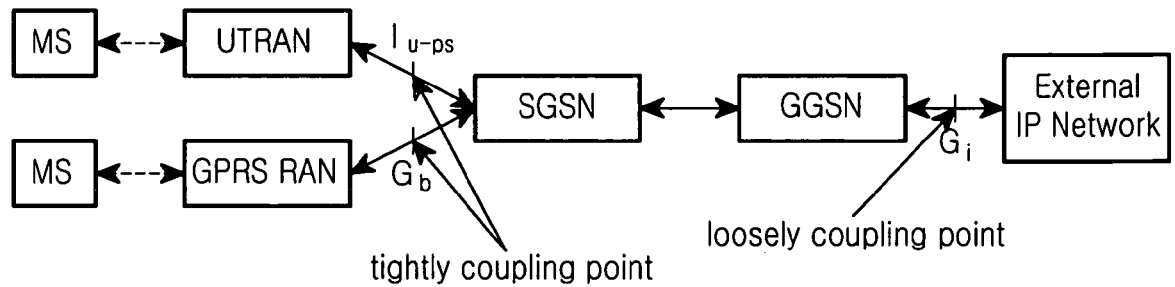
FIG. 1 is a diagram illustrating a general coupling system between a mobile communication system and a wireless LAN.
Figure 2:
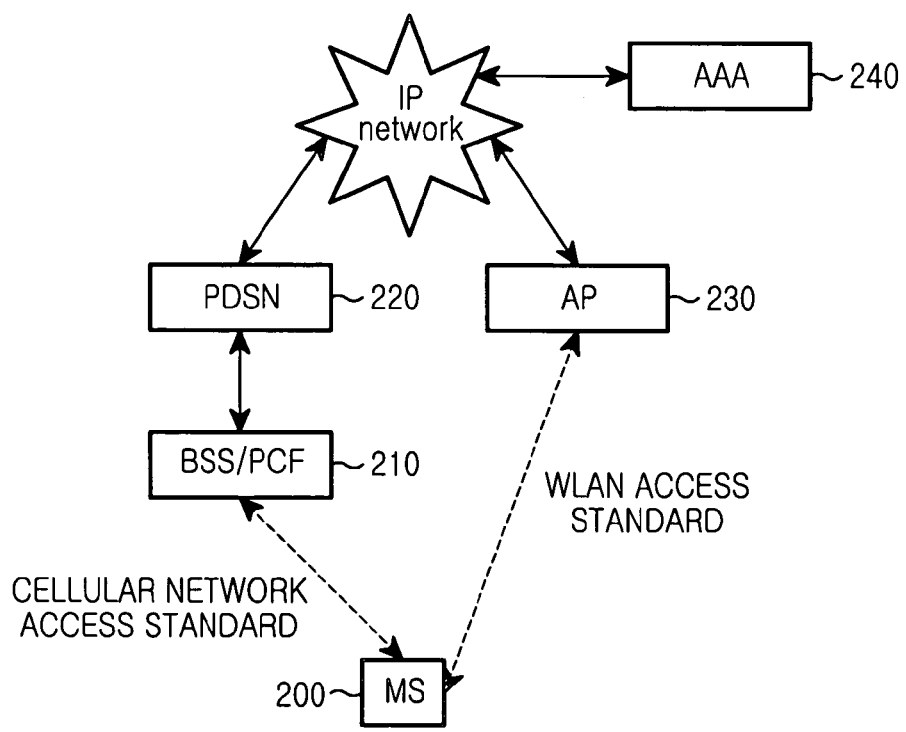
FIG. 2 is a diagram illustrating a general loosely-coupled method between a mobile communication system and a wireless LAN.
Figure 3:
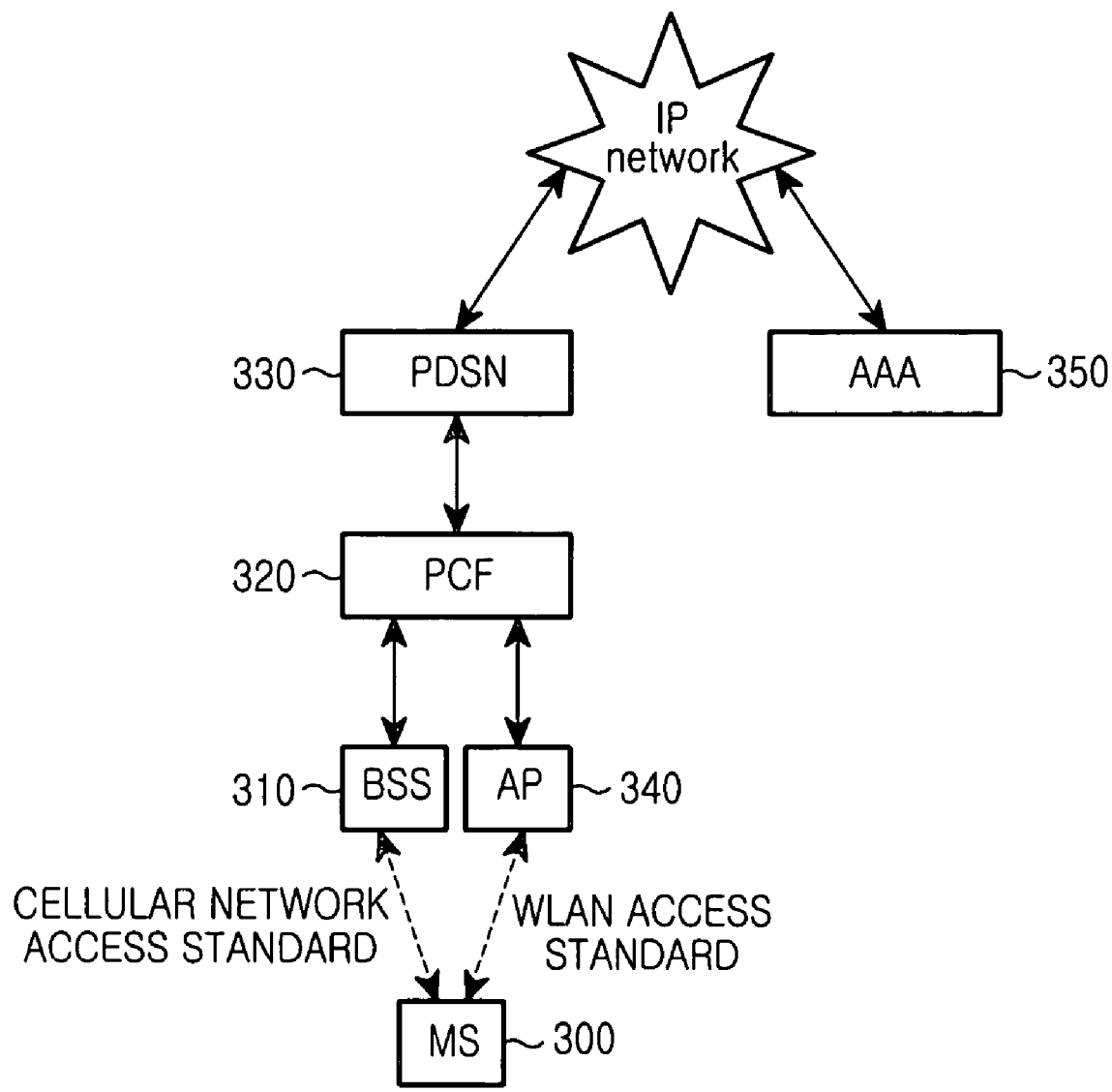
FIG. 3 is a diagram illustrating a general tightly-coupled method between a mobile communication system and a wireless LAN.
Figure 4:
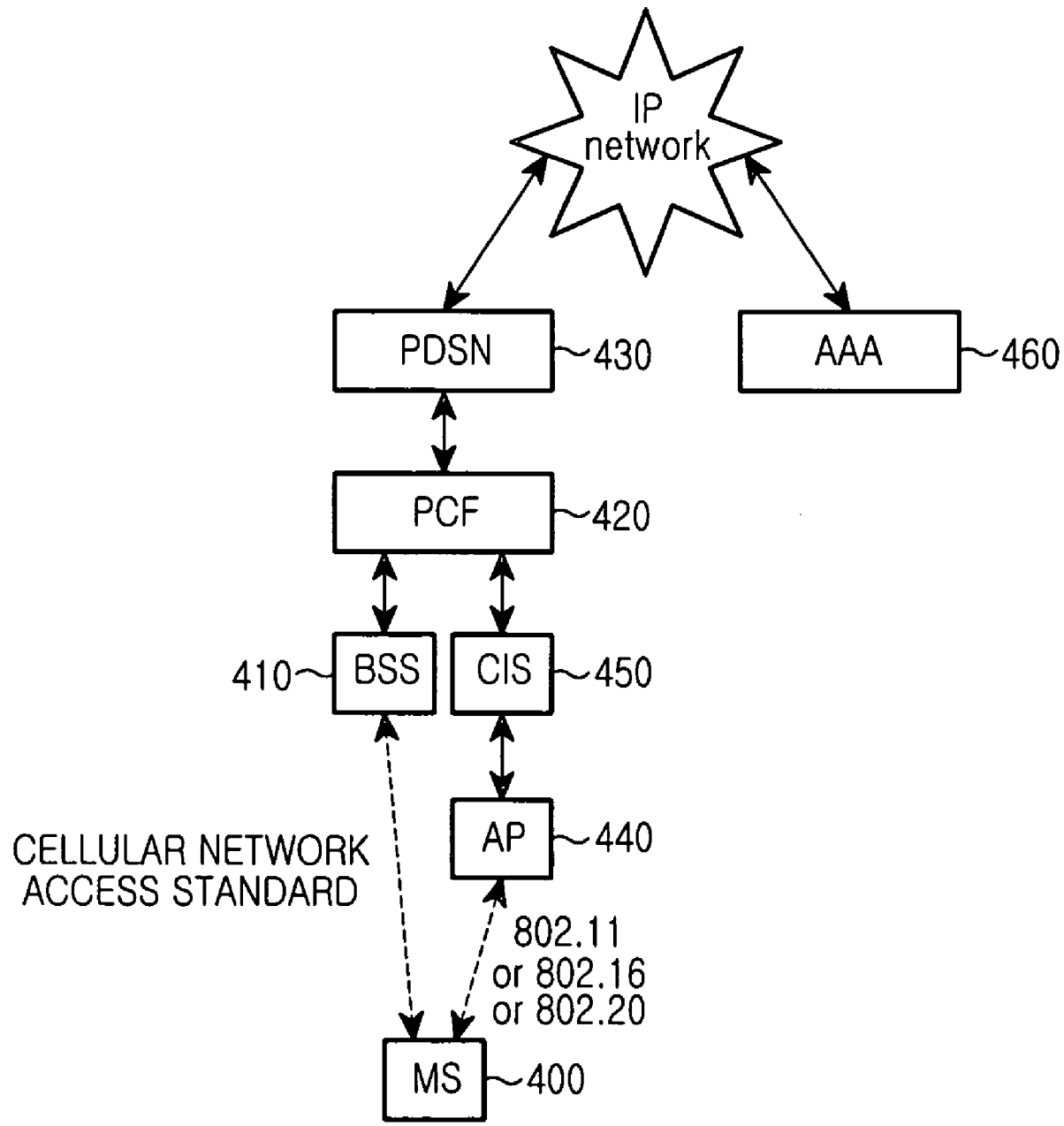
FIG. 4 is a coupling system between a mobile communication system and a wireless LAN according to an embodiment of the present invention.

As illustrated in FIG. 4, a system for coupling between a mobile communication system and a wireless LAN according to an embodiment of the present invention employs the tightly-coupled method. The coupling system introduces a new network element serving as a gateway for coupling between a mobile communication system and a wireless LAN. The coupling system between a mobile communication system and a wireless LAN including the new network element according to an embodiment of the present invention includes a mobile station (MS) 400 capable of accessing both a cellular network and a wireless LAN, an access point (AP) 440, a CDMA interworking server (CIS) 450, a packet control function (PCF) 420, and a packet data service node (PDSN) 430. When the mobile station 400 is connected to the cellular network, the mobile station 400 is connected to the packet control function 420 and the packet data service node 430 via a base station system (BSS) 410 using a cellular network access standard. The mobile station 400 communicates with a correspondent node (CN) via the packet data service node 430 and an Internet Protocol (IP) network. However, when the mobile station 400 is connected to the wireless LAN, the mobile station 400 discovers a CIS 450 through the access point 440. The CIS 450 is connected to the packet control function 420 and the packet data service node 430, and the mobile station 400 communicates with a correspondent node via the packet control function 420, the packet data service node 430 and the IP network.

The mobile station 400, as it moves to an area of a mobile communication system or a wireless LAN, selects a corresponding network so that it can receive packet data in the corresponding area. The mobile station 400 makes point-to-point (PPP) connections to access the mobile communication system, while the mobile station 400 does not make PPP connections to access the wireless LAN. To make a connection from the cellular network to the wireless LAN or from the wireless LAN to the cellular network, the mobile station 400 performs a procedure for discovering the CIS 450 proposed in an embodiment of the present invention for coupling between the mobile communication system and the wireless LAN. Further, the mobile station 400 preferably performs A9/A11 signaling in the wireless LAN in association with its CDMA signaling gateway (CSG) and a CSG of the CIS 450 in the wireless LAN.

The access point 440 uses a wireless LAN access standard for the mobile station 400, so that the mobile station 400 accesses the wireless LAN, and there is no change while the access point 440 makes coupling between the mobile communication system and the wireless LAN. The wireless LAN access standard between the mobile station 400 and the access point 440 preferably includes 802.11, 802.16 and 802.20. The standard 802.11 is provided for a wireless access over a wireless LAN, and the standards 802.16 and 802.20 are provided for a wireless access over a metropolitan area network (MAN). Therefore, in the following description, the wireless LAN includes the MAN.

The CIS 450 performs A9/A11 signaling in the wireless LAN in association with its CSG and a CSG of the mobile station 400. During a wireless LAN access, the CIS 450 interworks with an AAA server 460 for authentication.

The packet control function 420 does not have a dormant state while making a wireless LAN access. The packet control function 420 provides the packet data service node 430 with information on a network to which the mobile station 400 has accessed. To this end, it is necessary to define a service option for the wireless LAN.

The packet data service node 430 is connected to an IP network, and performs accounting and PPP operations in different ways according to whether the network accessed by the mobile station 400 is a mobile communication system or a wireless LAN. The packet data service node 430 serves as an AAA client for the mobile communication system and the wireless LAN. In particular, when Mobile IP is used, the packet data service node 430 serves as an external foreign agent (FA) for the mobile communication system and the wireless LAN. Herein, a Mobile IP service refers to a service for allowing a mobile station to receive the same service as that received in a home area using the same IP address even when in another area using an IP address registered in a home agent.

When Simple IP is used, the packet data service node 430 performs IP address assignment for the mobile communication system and the wireless LAN. A Simple IP service will be described herein below. The mobile station 400 is assigned a Simple IP address via the packet data service node 430, and accesses the Internet or a private network using a temporary IP address. In Simple IP, if the mobile station 400 moves out of a service area of the packet data service node 430 which assigns a Simple IP address thereto, the mobile station 400 should access a new packet data service node to be assigned a new Simple IP address, causing a possible interruption of service. In the mobile communication system, an area covered by one packet data service node is generally defined as a packet zone, and a mobile station recognizes a change in the packet zone using a packet zone identifier transmitted from a base station system (BSS) over an overhead channel, and starts a related handoff operation upon detecting the change in the packet zone.

Figure 5:
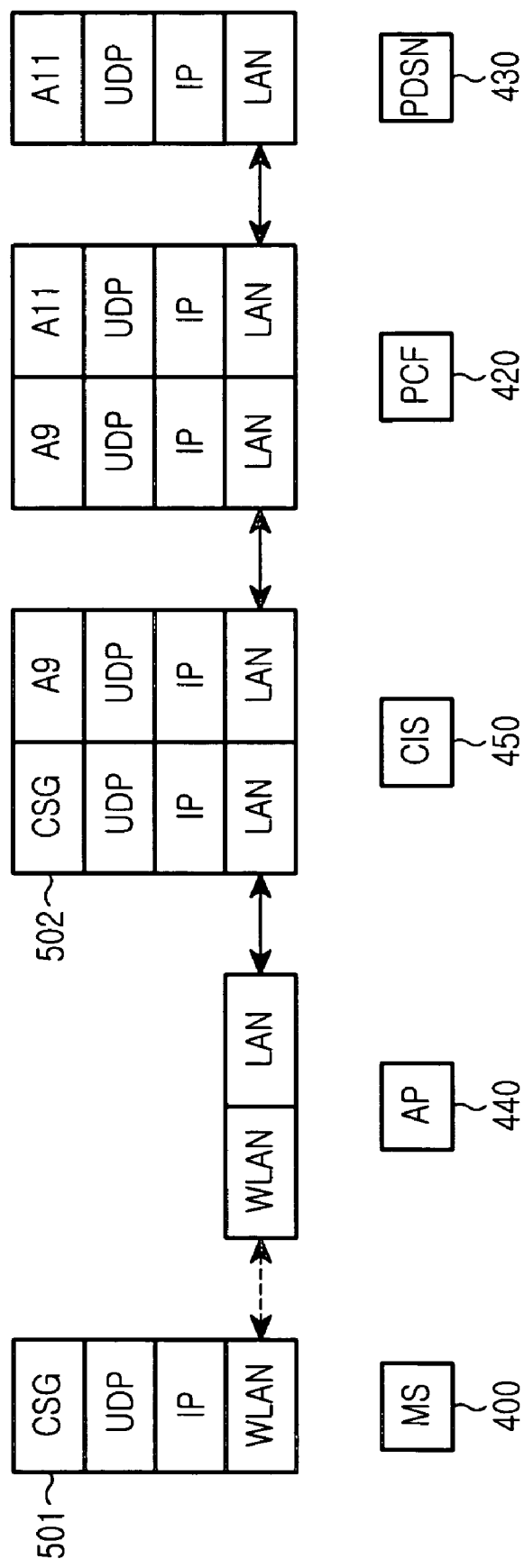
FIG. 5 is diagram illustrating a protocol stack for a signaling mode in a coupling system between a mobile communication system and a wireless LAN according to an embodiment of the present invention.

FIG. 5 is diagram illustrating a protocol stack for a signaling mode in a coupling system between a mobile communication system and a wireless LAN according to an embodiment of the present invention. Referring to FIG. 5, a CSG 502 included in the CIS 450 serving as a gateway for coupling between a mobile communication system and a wireless LAN, together with a CSG 501 of the mobile station 400, performs A9/A11 signaling in the wireless communication system and the wireless LAN. The CSGs 501 and 502 are application processors that operate in a user datagram protocol (UDP) layer for A9/A11 signaling.

The mobile station 400 performs an association with the access point 440 that uses a wireless LAN access standard. The access point 440 discovers the CIS 450 that services a hot spot where it is currently located. Upon the discovery, the access point 440 performs IP broadcasting. Here, the "hot spot" refers to a zone where an access point is installed by an Internet service provider to provide a wireless LAN service.

Figure 6:
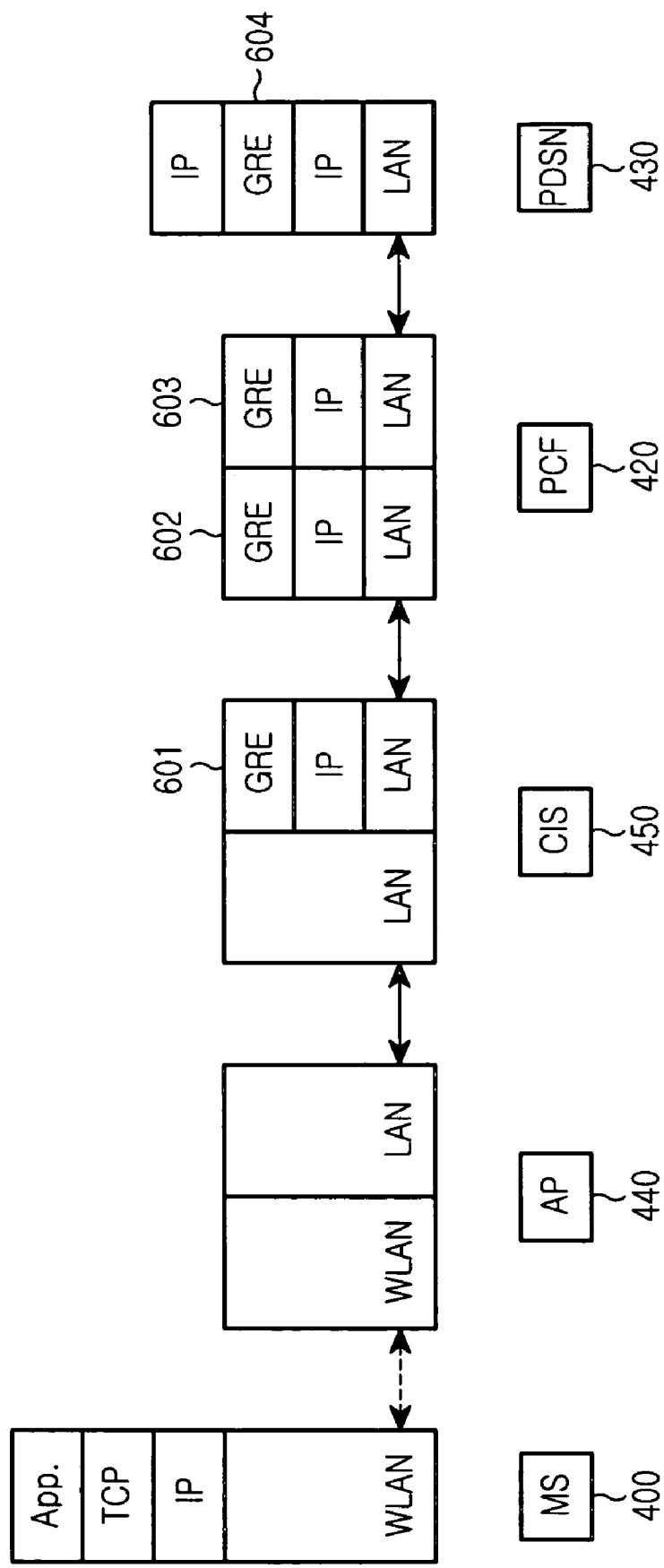
FIG. 6 is a diagram illustrating a protocol stack for a traffic mode in a coupling system between a mobile communication system and a wireless LAN according to an embodiment of the present invention.

FIG. 6 is a diagram illustrating a protocol stack for a traffic mode in a coupling system between a mobile communication system and a wireless LAN according to an embodiment of the present invention. Referring to FIG. 6, when traffic is received from the mobile station 400 via the wireless LAN, the CIS 450 forwards the traffic to the packet control function 420. In this case, a generic routing encapsulation (GRE) 601 of the CIS 450 establishes a tunnel to a GRE 602 of the packet control function 420, and forwards the corresponding traffic to the packet control function 420 through the established tunnel. The CIS 450 uses information previously determined through A9 signaling described in connection with FIG. 5 to establish a tunnel through the GRE 602.

In addition, GRE 603 of the packet data service node 420 establishes a tunnel to GRE 604 of the packet data service node 430, and forwards the corresponding packet to the packet data service node 430 through the established tunnel.

Figure 7:
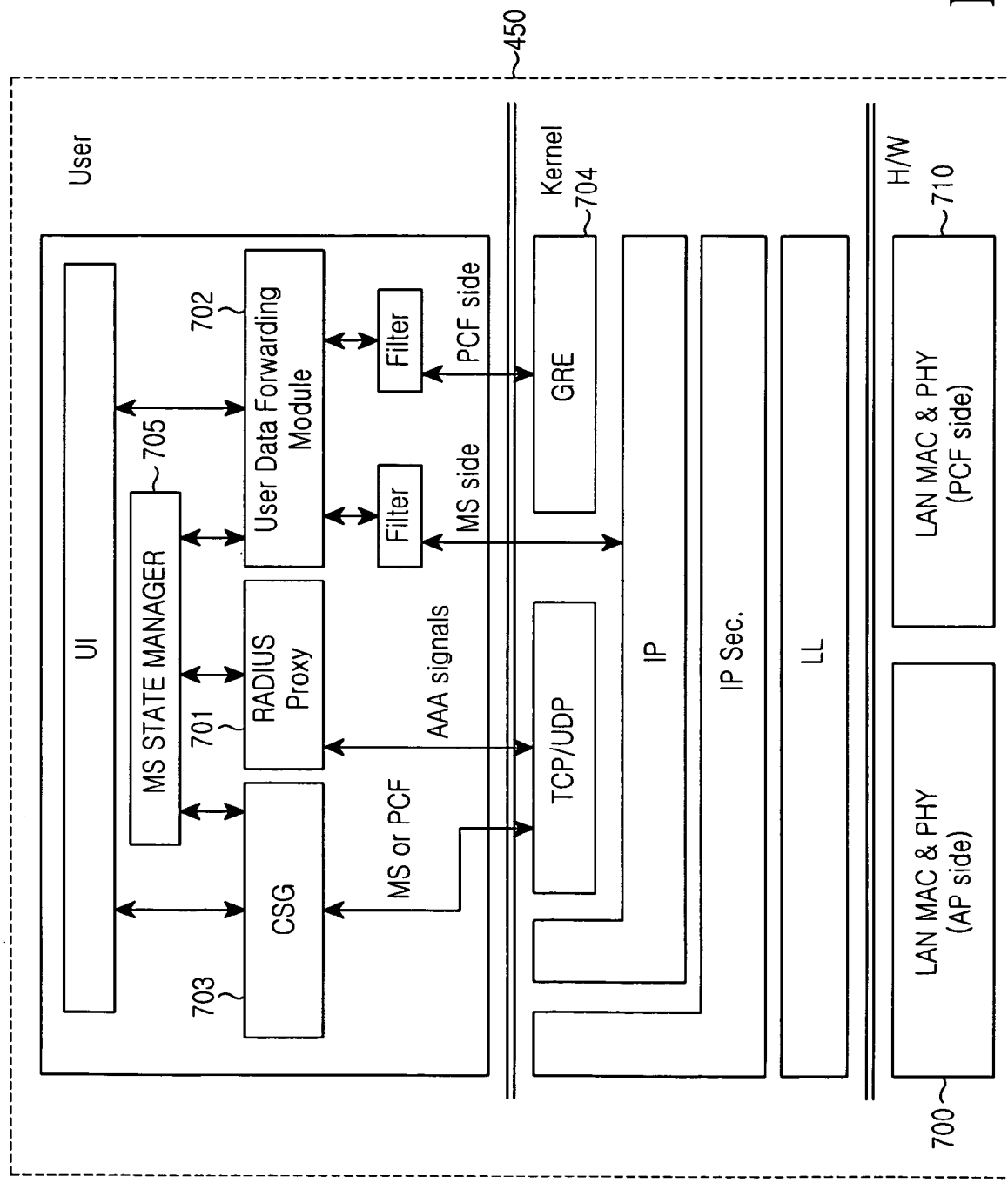
FIG. 7 is a block diagram illustrating a detailed structure of a CDMA interworking server (CIS) in a coupling system between a mobile communication system and a wireless LAN according to an embodiment of the present invention.

FIG. 7 is a block diagram illustrating a detailed structure of a CIS in a coupling system between a mobile communication system and a wireless LAN according to an embodiment of the present invention. Referring to FIG. 7, the CIS 450 has a physical layer 700 for communicating with the access point 440 via a LAN, and a physical layer 710 for communicating with the packet control function 420 via the LAN.

A CSG 703 of the CIS 450 is identical to the CSG 502 illustrated in FIG. 5. If an access network that the mobile station 400 currently accesses is a wireless LAN, the CSG 501 of the mobile station 400 performs A9/A11 signaling in association with the CSG 703. A remote authentication dial-in user services (RADIUS) proxy 701 of the CIS 450 performs authentication on the wireless LAN. A user data forwarding module 702, using GRE 704, which is identical to the GRE 601 of FIG. 6, establishes a tunnel to the packet control function 420, transmits traffic to the packet control function 420 through the established tunnel.

An MS state manager 705 manages the state of the mobile station 400. That is, the MS state manager 705 determines whether the mobile station 400 is connected to a mobile communication system or a wireless LAN, and manages the state of the mobile station 400 according to the determination result.

Figure 8:
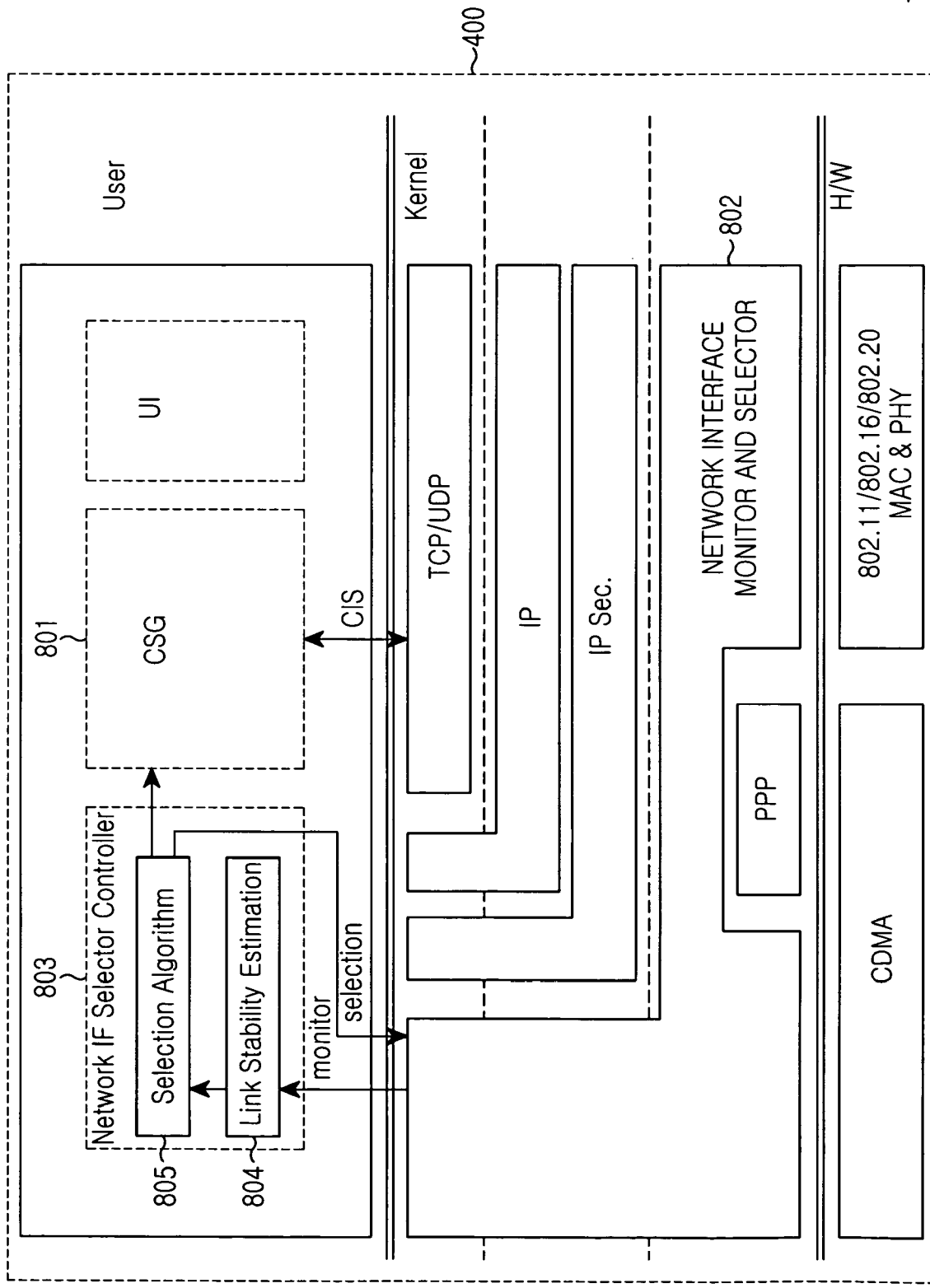
FIG. 8 is a block diagram illustrating a detailed structure of a mobile station in a coupling system between a mobile communication system and a wireless LAN according to an embodiment of the present invention.

FIG. 8 is a block diagram illustrating a detailed structure of a mobile station in a coupling system between a mobile communication system and a wireless LAN according to an embodiment of the present invention. Referring to FIG. 8, if an access network that the mobile station 400 currently accesses is a wireless LAN, a CSG 801 being identical to the CSG 501 of FIG. 5 exchanges A9/A11 signals with the CIS 450. A network interface monitor and selector 802 collects information on an available access network by monitoring a network interface (IF) selector controller 803, and selects the best network based on the information, thereby switching between the mobile communication system and the wireless LAN. A PPP connection is made only when an access network that the mobile station 400 currently accesses is a mobile communication system. That is, the PPP connection is not made when an access network that the mobile station 400 currently accesses is a wireless LAN.

The network IF selector controller 803 includes a link stability estimator 804 and a selection algorithm 805. The link stability estimator 804 determines a time when the mobile station 400 previously connected to the cellular network is connected to an access point, i.e., connected to a wireless LAN, or a time when the mobile station 400 previously connected to the wireless LAN moves to the cellular network. Based on the determination result, the selection algorithm 805 switches the mobile station 400 from the cellular network to the wireless LAN, or from the wireless LAN to the cellular network.

Figure 9:
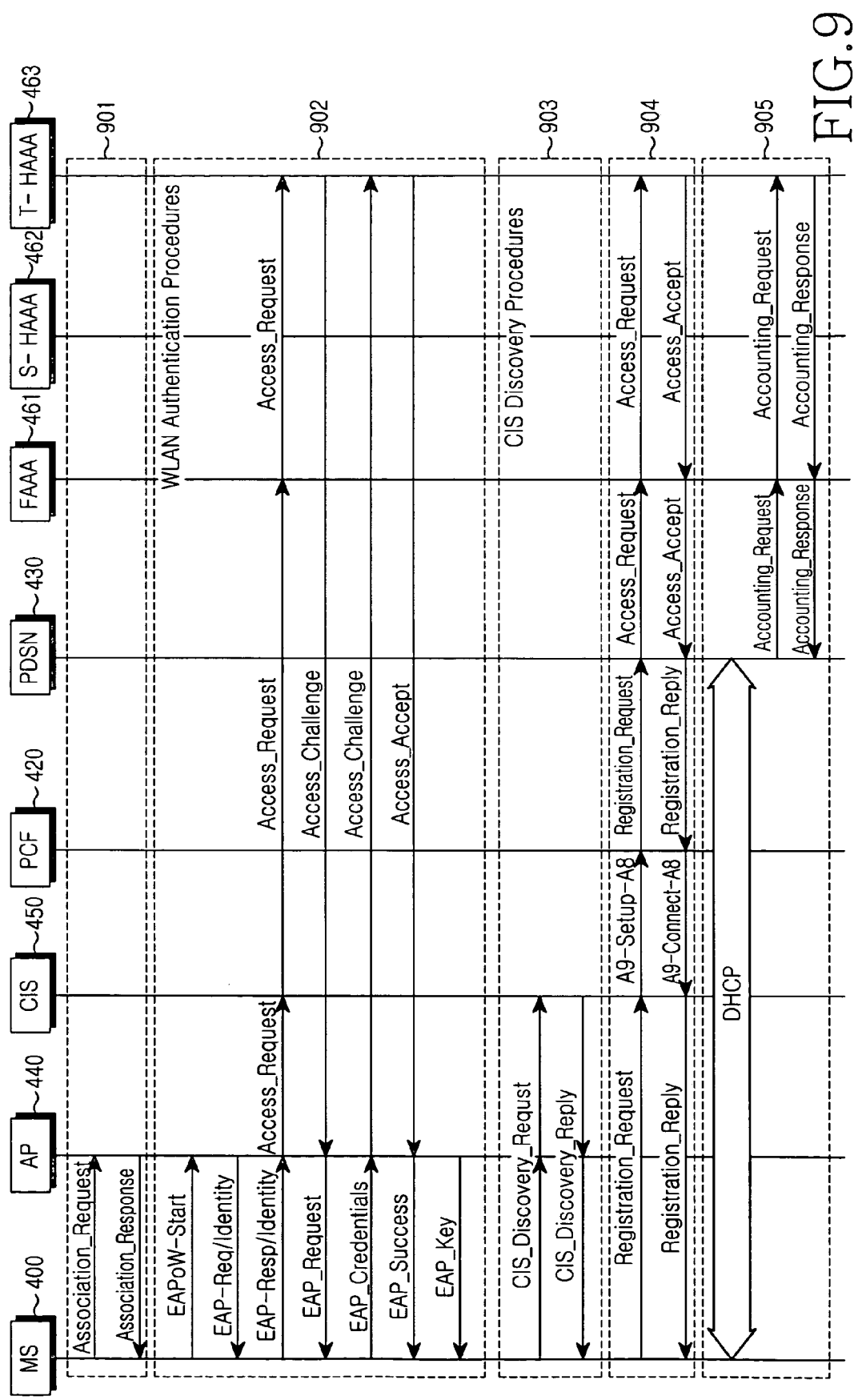
FIG. 9 is a diagram illustrating a procedure for processing a data call using Simple IP in a coupling system between a mobile communication system and a wireless LAN according to an embodiment of the present invention.

FIG. 9 is a diagram illustrating a procedure for processing a data call using Simple IP in a coupling system between a mobile communication system and a wireless LAN according to an embodiment of the present invention. Referring to FIG. 9, in step 901, a mobile station 400 performs association with an access point 440 in a wireless LAN area to thereby access the access point 440. In step 902, the mobile station 400 performs authentication for wireless LAN accessing. In step 903, the mobile station 400 performs a CIS discovery procedure for discovering a CIS 450, which will couple the mobile station 400 located in the wireless LAN service area to the mobile communication system. The CIS discovery procedure should necessarily be performed in order for the mobile station 400 to interwork with the mobile communication system via the wireless LAN. The CIS discovery procedure is achieved through IP broadcasting by the access point 440 to which the mobile station 400 is connected via the wireless LAN. After discovering the CIS 450, in step 904, the mobile station 400 transmits a Registration Request message to the CIS 450 using the CSG 501 illustrated in FIG. 5. The Registration Request message transmitted to the CIS 450 includes International Mobile Station Identity (IMSI) and location information of the mobile station 400, necessary for generating an A9_Setup_A8 message transmitted by the CIS 450 to a packet control function 420. Upon receiving the Registration Request message from the mobile station 400, the CIS 450 generates an A9_Setup_A8 message and transmits the A9_Setup_A8 message to the packet control function 420. Accounting and PPP operations are performed in different ways according to whether an access network of the packet control function 420 and a packet data service node 430 is a mobile communication system or a wireless LAN. Therefore, the CIS 450 specifies that the connection request is initiated by the wireless LAN in transmitting the A9_Setup_A8 message to the packet control function 420. To this end, a new service option for a wireless LAN can be simply defined.

In step 905, if the mobile station 400 uses the wireless LAN, it is assigned an IP address. The IP address assignment is achieved through Dynamic Host Configuration Protocol (DHCP) instead of Internet Protocol Control Protocol (IPCP) for PPP connection. Thereafter, if the packet data service node 430 transmits an Accounting Request message to a foreign AAA (FAAA) 461 to perform accounting, the FAAA 461 forwards the Accounting Request message to a target-home AAA (T-HAAA) 463. Then the T-HAAA 463 transmits to the FAAA 461 an Accounting Response message including accounting information acquired by collecting call details of the mobile station 400, and the FAAA 461 forwards the Accounting Response message to the packet data service node 430. Based on the Accounting Response message, the packet data service node 430 performs accounting on the mobile station 400.

Figure 10:
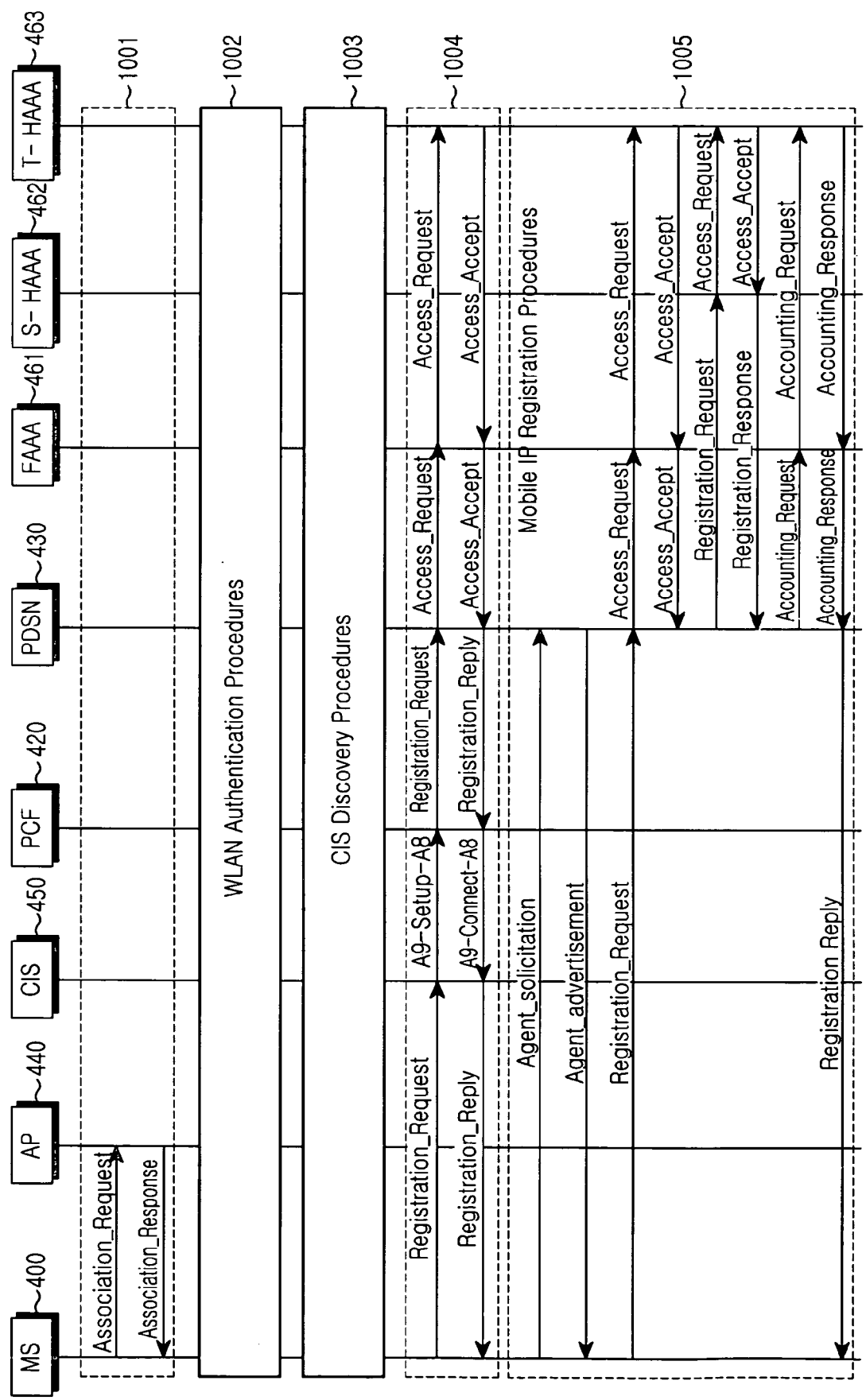
FIG. 10 is a diagram illustrating a procedure for processing a data call in a wireless LAN using Mobile IP in a coupling system between a mobile communication system and a wireless LAN according to another embodiment of the present invention.

FIG. 10 is a diagram illustrating a procedure for processing a data call in a wireless LAN using Mobile IP in a coupling system between a mobile communication system and a wireless LAN according to another embodiment of the present invention. The Mobile IP-based procedure of FIG. 10 is identical to the Simple IP-based procedure of FIG. 9 in the operation of steps 1001 to 1004 except for the IP address assignment. When Mobile IP is used, care-of-addresses (CoA) are assigned in a Mobile IP registration procedure in step 1005. An authentication procedure is also performed in the Mobile IP registration procedure.

The Mobile IP registration procedure will now be described herein below. If a mobile station 400 transmits an Agent Solicitation message to a packet data service node 430, the packet data service node 430 transmits an Agent Advertisement message to the mobile station 400. Then the mobile station 400 transmits a Registration Request message to the packet data service node 430. The packet data service node 430 then transmits an Access Request message to a T-HAAA 463 via an FAAA 461 to perform authentication. The T-HAAA 463 then transmits an Access Accept message to the packet data service node 430 via the FAAA 461 to inform that the access was made successfully. Thereafter, the packet data service node 430 transmits a Registration Request message to a source-home AAA (S-HAAA) 462 to register an IP address, and the S-HAAA 462 forwards the Registration Request message to the T-HAAA 463. The S-HAAA 462 transmits a Registration Response message to the packet data service node 430, thereby performing the IP registration procedure. Thereafter, if an accounting operation by the packet data service node 430 and the T-HAAA 463 is achieved, the packet data service node 430 transmits a Registration Reply message to the mobile station 400.

Figure 11:
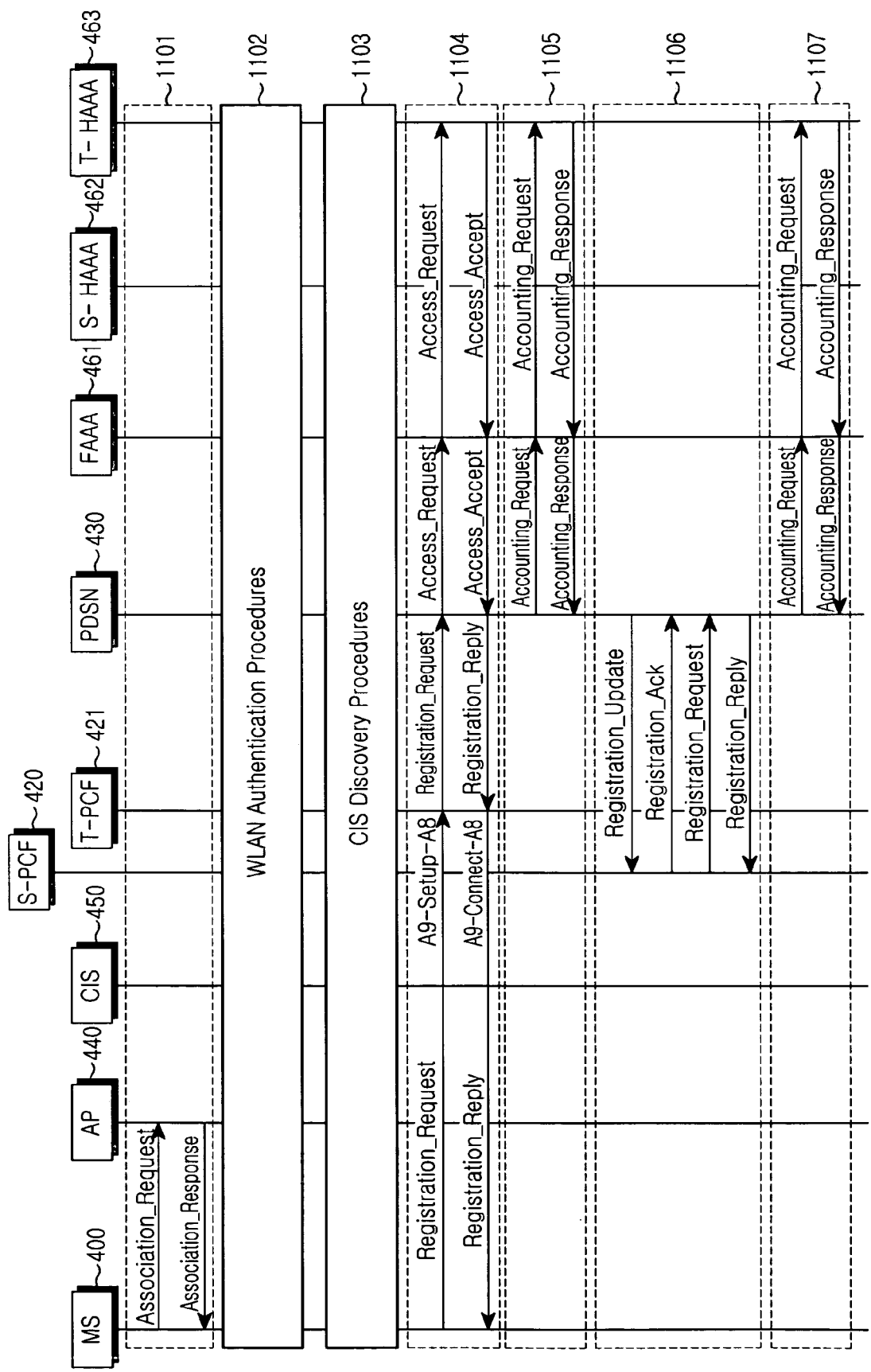
FIG. 11 is a diagram illustrating a handoff procedure from a mobile communication system to a wireless LAN using Simple IP in a coupling system between the mobile communication system and the wireless LAN according to another embodiment of the present invention.

FIG. 11 is a diagram illustrating a handoff procedure from a mobile communication system to a wireless LAN using Simple IP in a coupling system between the mobile communication system and the wireless LAN according to another embodiment of the present invention. The procedure of FIG. 11 is identical to the procedure of FIG. 9 in the call setup process of steps 1101 to 1104 in the wireless LAN. However, because an IP address assigned in the mobile communication system is used even in the wireless LAN, a separate DHCP process for IP address assignment is not required. A procedure following the call setup process in the wireless LAN is illustrated in steps 1105 to 1107.

After the call setup procedure, in step 1105, the packet data service node 430 transmits an Accounting Request message to an FAAA 461, and the FAAA 461 forwards the Accounting Request message to a T-HAAA 463. The T-HAAA 463, after performing an accounting operation, transmits an Accounting Response message to the packet data service node 430 via the FAAA 461.

In step 1106, the packet data service node 430 transmits a Registration Update message to a source packet control function (S-PCF) 420, and the S-PCF 420 performs IP registration and then transmits a Registration Acknowledgement (Ack) message to the packet data service node 430.

Then the S-PCF 420 transmits a Registration Request message to the packet data service node 430, and the packet data service node 430 transmits a Registration Reply message to the S-PCF 420. Therefore, in step 1106, when a handoff is performed from the mobile communication system to the wireless LAN, an IP registration procedure is performed.

In step 1107, the packet data service node 430 again performs the accounting procedure performed in step 1105.

Figure 12:
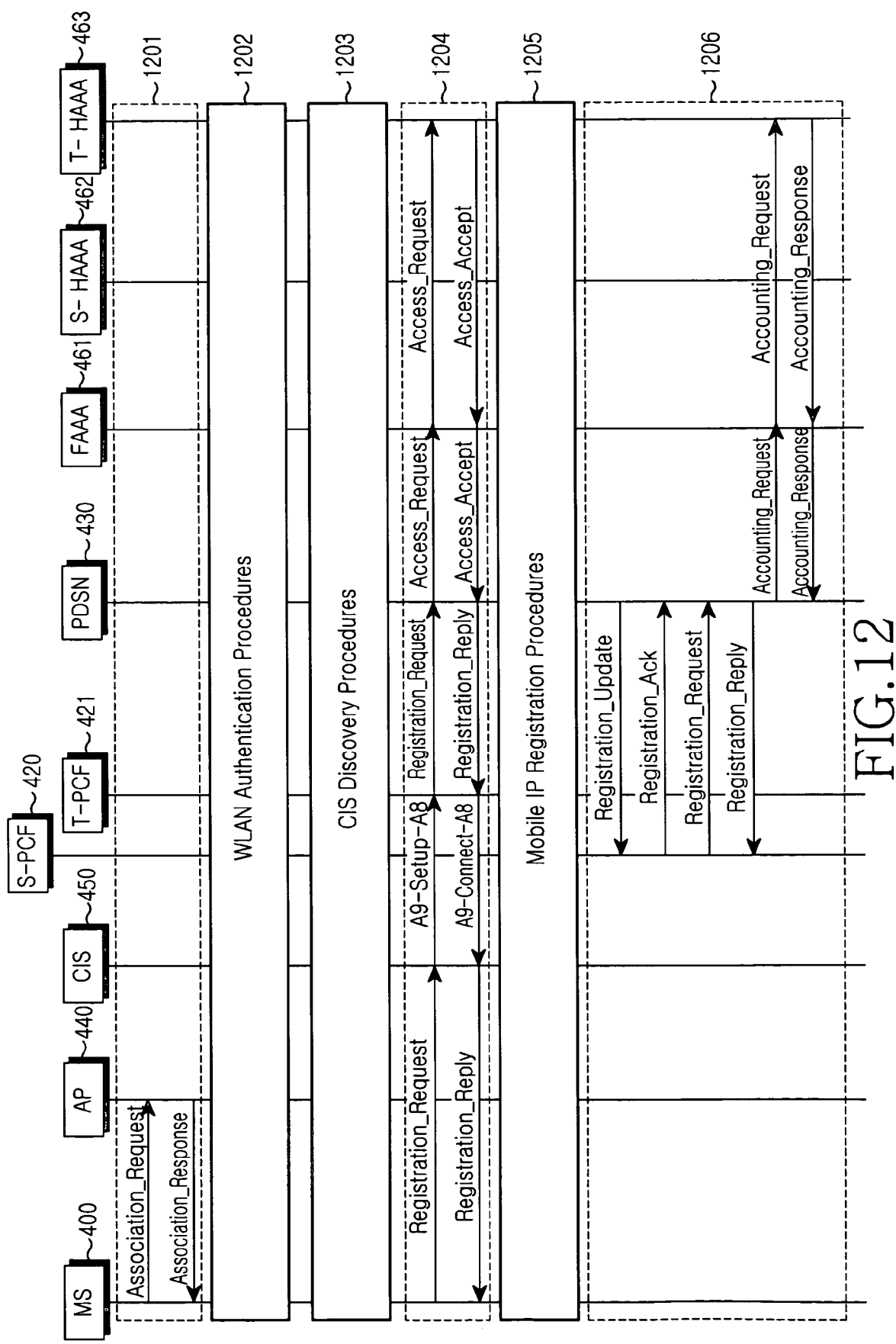
FIG. 12 is a diagram illustrating a handoff procedure from a mobile communication system to a wireless LAN using Mobile IP in a coupling system between the mobile communication system and the wireless LAN according to another embodiment of the present invention.

FIG. 12 is a diagram illustrating a handoff procedure from a mobile communication system to a wireless LAN using Mobile IP in a coupling system between the mobile communication system and the wireless LAN according to another embodiment of the present invention. The procedure of FIG. 12 is identical to the procedure of FIG. 10 in the call setup process of steps 1201 to 1205 in the wireless LAN. A procedure following the call setup process will be described herein below.

In step 1206, a packet data service node 430 transmits a Registration Update message to an S-PCF 420, and the S-PCF 420 performs IP registration and then transmits a Registration Ack message to the packet data service node 430.

Then the S-PCF 420 transmits a Registration Request message to the packet data service node 430, and the packet data service node 430 transmits a Registration Reply message to the S-PCF 420. Therefore, in step 1206, when a handoff is performed from the mobile communication system to the wireless LAN, an IP registration procedure is performed.

In step 1207, the packet data service node 430 performs an accounting procedure.

Figure 13:
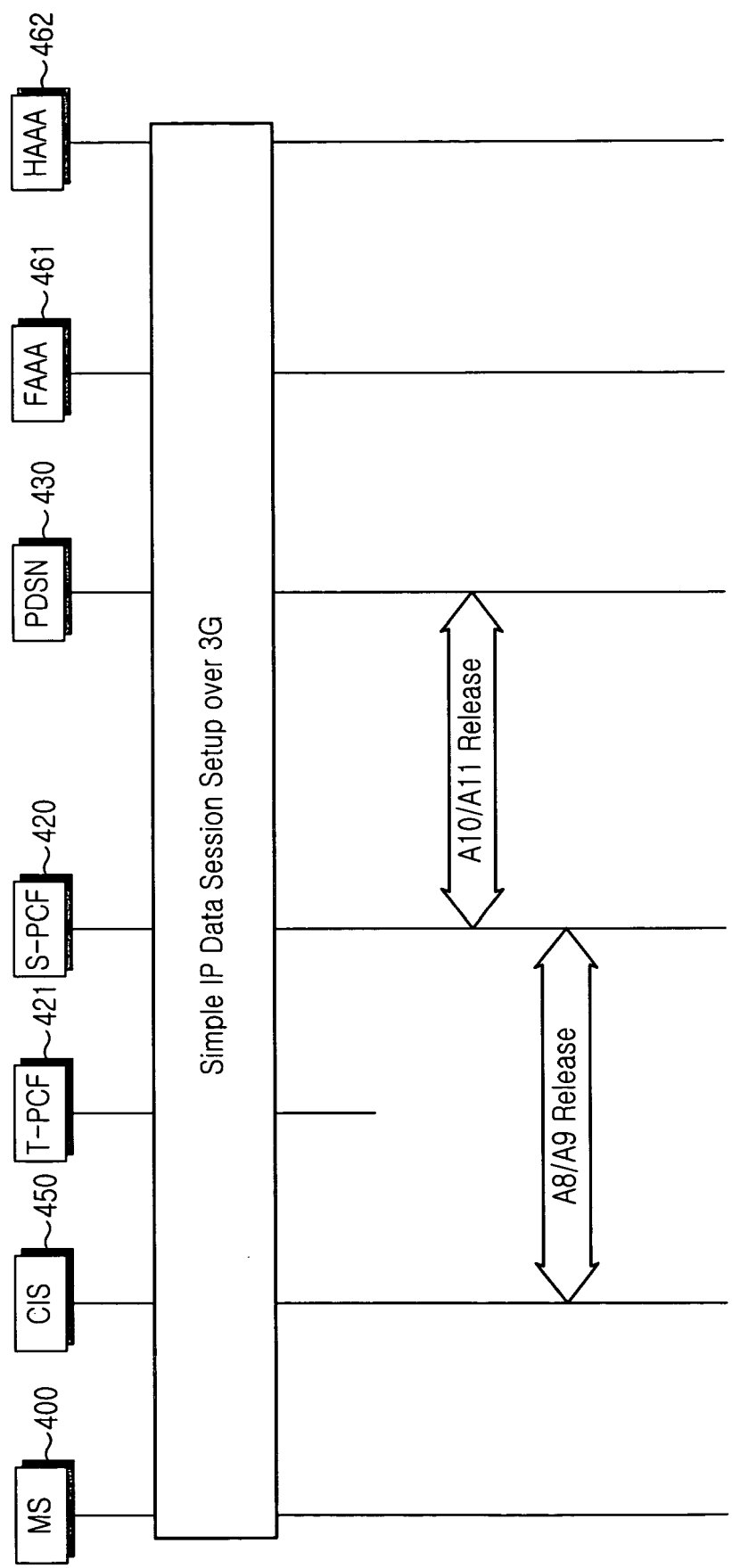
FIG. 13 is a diagram illustrating a handoff procedure from a wireless LAN to a mobile communication system using Simple IP in a coupling system between the mobile communication system and the wireless LAN according to another embodiment of the present invention.

FIG. 13 is a diagram illustrating a handoff procedure from a wireless LAN to a mobile communication system using Simple IP in a coupling system between the mobile communication system and the wireless LAN according to another embodiment of the present invention. The procedure of FIG. 13 is identical to the procedure of FIG. 9 in the call setup process in the mobile communication system. However, when handoff is performed from the wireless LAN to the mobile communication system, because an IP address assigned in the wireless LAN is used even in the mobile communication system, it is necessary to allow a mobile station to use an IP address previously assigned in an IPCP process in a PPP setup process without modification.

Figure 14:
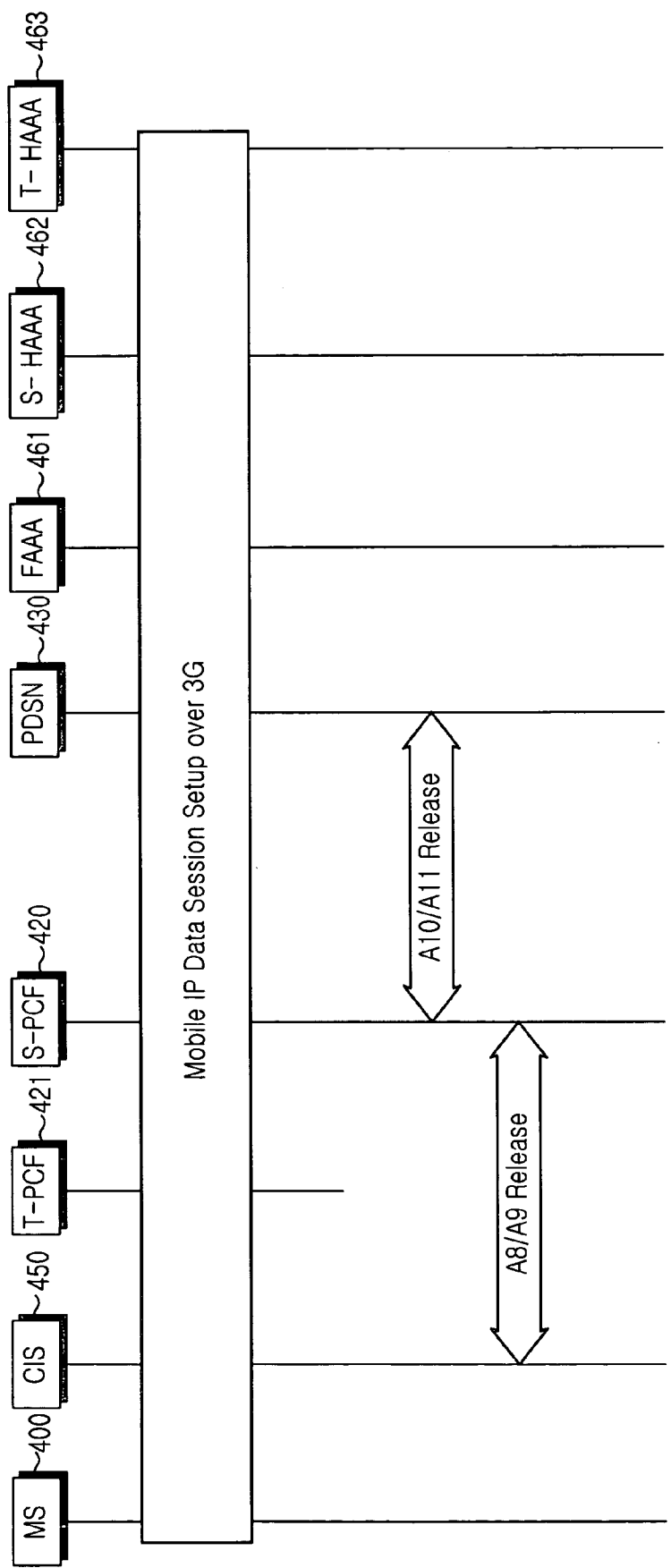
FIG. 14 is a diagram illustrating a handoff procedure from a wireless LAN to a mobile communication system using Mobile IP in a coupling system between the mobile communication system and the wireless LAN according to another embodiment of the present invention.

FIG. 14 is a diagram illustrating a handoff procedure from a wireless LAN to a mobile communication system using Mobile IP in a coupling system between the mobile communication system and the wireless LAN according to another embodiment of the present invention. The procedure of FIG. 14 is identical to the procedure of FIG. 10 in the call setup process in the mobile communication system. However, when the handoff is performed from the wireless LAN to the mobile communication system, because an IP address assigned in the wireless LAN is used even in the mobile communication system, it is necessary to allow a mobile station to use an IP address previously assigned in an IP registration procedure without modification.

Therefore, the system and method for coupling between a mobile communication system and a wireless LAN based on the tightly-coupled method proposed in the embodiments of the present invention can reduce the handoff time between couplings and prevent data loss. In addition, the present invention can provide a handoff between a mobile communication and a wireless LAN for a mobile station using either Simple IP or Mobile IP.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for providing seamless communication when a mobile station moves between a wireless local area network (LAN) system and a mobile communication system, the system comprising:
   a packet data service node for providing a packet data service between an Internet Protocol (IP) network and the mobile station when the mobile station accesses the mobile communication system;
   a packet control function for providing the packet data service between a correspondent node connected to the IP network and the mobile station when the mobile station previously connected to the mobile communication system is connected to an access point, and providing the packet data service between the correspondent node connected to the IP network and the mobile station when the mobile station previously connected to the access point is connected to a base station system; and
   an interworking server is connected between the access point of the wireless LAN system and the packet control function of the mobile communication system, for coupling the packet control function to the access point when providing the packet data service to the mobile station.

2. The system of claim 1, wherein the interworking server, which includes a signaling gateway in the mobile communication system, performs signaling in association with the mobile station, and performs an association with the mobile communication system.

3. A method for providing seamless communication when a mobile station moves between a wireless local area network (LAN) system and a mobile communication system, the method comprising the steps of:
   performing an association with the mobile station through an access point of the wireless LAN system;
   transmitting an authentication key generated as a result of performing an authentication on the mobile station to the mobile station via the access point by an authentication, authorization and accounting (AAA) server of the wireless LAN system;
   receiving a message for discovering an interworking server from the mobile station, searching the interworking server through Internet Protocol (IP) broadcast by the access point of the wireless LAN system;
   providing corresponding information to the mobile station by the access point of the wireless LAN system, at a time there is an interworking server that can connect with the access point as a result of the search;
   generating by the interworking server a connection setup message and transmitting the connection setup message to a packet control function;
   transmitting by the packet control function, an IP registration request message to a packet data service node; and
   registering by the packet data service node, an IP address of the mobile station in a home agent via an IP network, and newly assigning an IP address when the mobile station moves between the mobile communication system and the wireless LAN system.

4. The method of claim 3, wherein the connection setup message includes information indicating that the interworking server is connected to the access point.

5. A method for providing seamless communication when a mobile station that communicates with a wireless local area network (LAN) system and a mobile communication system moves between the wireless LAN system and the mobile communication system, the method comprising the steps of:
   accessing by the mobile station, an access point by performing an association with the access point;
   sending by the mobile station, an authentication request for the mobile station to an authentication, authorization and accounting (AAA) server via the access point, and receiving an authentication key from the AAA server;
   searching an interworking server using an Internet Protocol (IP) broadcasting function of the access point, at a time the mobile station transmits a message for discovering an interworking server to the access point;
   providing corresponding information to the mobile station by the access point of the wireless LAN system, when there is an interworking server that can connect with the access point as a result of the search;
   generating by the interworking server a connection setup message and transmitting the connection setup message to a packet control function;
   transmitting by the packet control function an IP registration request message to the packet data service node; and
   registering by the packet data service node an IP address of the mobile station in a home agent via an IP network, and newly assigning an IP address at a time the mobile station moves between the mobile communication system and the wireless LAN system.

6. The method of claim 5, wherein the connection setup message includes information indicating that the interworking server is connected to the access point.

7. An apparatus for providing seamless communication when a mobile station that communicates with a wireless local area network (LAN) system and a mobile communication system moves between the wireless LAN system and the mobile communication system, the apparatus comprising:

- a network interface selector controller for determining a time when the mobile station previously connected to a mobile communication system is connected to an access point or a time when the mobile station previously connected to the access point moves to the mobile communication system, and controlling switching between the mobile communication system and the wireless LAN system through a selection algorithm based on the determination result;
- a network interface monitor and selector for collecting information on an available access network by monitoring the network interface selector controller, and selecting a best network based on the information; and
- a signaling gateway for exchanging signals with an interworking server connected to the access point to perform communication with the selected best network;
- wherein the interworking server is connected between the access point of the wireless LAN system and a packet control function of the mobile communication system, for coupling the packet control function to the access point when providing a packet data service to the mobile station.

8. The apparatus of claim 7, wherein the signaling gateway performs A9/A11 signaling.

9. The apparatus of claim 7, wherein the packet control function is a packet control function for providing the packet data service between a correspondent node connected to the IP network and the mobile station.

10. An interworking server apparatus for providing a packet data service to a mobile station that communicates with a mobile communication system and a wireless local area network (LAN) system, the apparatus comprising:

- a state manager for managing the state of the mobile station;
- a signaling gateway connected to the state manager, for exchanging signals with the mobile station connected to an access point, at a time the mobile station moves between the mobile communication system and the wireless LAN system; and
- a user data forwarding module for establishing a tunnel to a packet control function and transmitting a packet data to the packet control function through the established tunnel to provide seamless communication at a time a handoff of the mobile station occurs between the wireless LAN system and the mobile communication system;
- wherein the interworking server is connected between the access point of the wireless LAN system and the packet control function of the mobile communication system, for coupling the packet function to the access point when providing the packet data service to the mobile station.

11. The apparatus of claim 10, wherein the signaling gateway exchanges A9/A11 signaling.

12. The apparatus of claim 10, wherein the packet control function is a packet control function for providing the packet data service between a correspondent node connected to the IP network and the mobile station.

* * * * *

UNITED STATES PATENT AND TRADEMARK OFFICE
CERTIFICATE OF CORRECTION

PATENT NO. : 7,616,598 B2
APPLICATION NO. : 10/952729
DATED : November 10, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this

Fourteenth Day of December, 2010

David J. Kappos
*Director of the United States Patent and Trademark Office*